(12) United States Patent
Chen

(10) Patent No.: US 11,779,188 B1
(45) Date of Patent: Oct. 10, 2023

(54) GLASS WASHER WITH ADJUSTABLE WATER TEMPERATURE

(71) Applicant: Haiyan Chen, Ruian (CN)

(72) Inventor: Haiyan Chen, Ruian (CN)

( * ) Notice: Subject to any disclaimer, the term of this patent is extended or adjusted under 35 U.S.C. 154(b) by 8 days.

(21) Appl. No.: 18/116,154

(22) Filed: Mar. 1, 2023

(30) Foreign Application Priority Data

Nov. 7, 2022 (CN) .......................... 202222954164.0
Nov. 7, 2022 (CN) .......................... 202222966134.1

(51) Int. Cl.
*A47L 15/00* (2006.01)
*F16L 15/00* (2006.01)
*A47L 15/42* (2006.01)

(52) U.S. Cl.
CPC ....... *A47L 15/0065* (2013.01); *A47L 15/4217* (2013.01); *F16L 15/008* (2013.01)

(58) Field of Classification Search
None
See application file for complete search history.

(56) References Cited

U.S. PATENT DOCUMENTS

| 717,061 A | 12/1902 | Witte |
| 2,636,199 A | 11/1950 | Stanton |

*Primary Examiner* — Rita P Adhlakha
(74) *Attorney, Agent, or Firm* — Georgi Korobanov

(57) ABSTRACT

An upper cover and a lower cover of a glass washer with adjustable water temperature are sleeved on a spool rod; the top end of the spool rod connect the bracket, and be connected to an upper joint, one end of the connecting rod is sleeved on the spool rod, and the other end passes through the gap between the upper cover and the lower cover, the cold water pipe and the first port in the valve core is connected; the hot water pipe is connected with the second port in the valve core. Use the cold water pipe and the hot water pipe to connect the hot and cold water respectively, and use the connecting rod to control the rotation of the valve core to select different water outlets, effectively solving the discomfort of using cold water to clean the cup in a cold environment.

10 Claims, 6 Drawing Sheets

GLASS WASHER WITH ADJUSTABLE WATER TEMPERATURE

CROSS-REFERENCE TO RELATED APPLICATIONS

This is a U. S. patent application which claims the priority and benefit of Chinese Patent Application Number 202222954164.0, filed on Nov. 7, 2022, and No. 202222966134.1, filed on Nov. 7, 2022, the disclosure of which is incorporated herein by reference in its entirety.

TECHNICAL FIELD

The present disclosure relates to the technical filed of glass washer, and in particular to a glass washer with adjustable water temperature.

BACKGROUND

At present, the glass washers on the market are all connected to cold water channels. In a relatively cold environment, washing the cup with cold water brings great discomfort to people.

SUMMARY

The purpose of the present disclosure is to provide a glass washer with adjustable water temperature, which can be connected with hot and cold water to solve the above-mentioned problems.

In order to achieve the above object, the present disclosure adopts the following technical solutions: a glass washer with adjustable water temperature, comprising a spool, a spool seat, a tooth pipe and a tooth cover, the spool comprises a spool sleeve, a spool rod, a first port and a second port, an outer sleeve of the spool seat is arranged with a tooth pipe, and a external thread of the tooth pipe is connected to the tooth cover, on the spool seat connect the spool; a gland nut is arranged on the spool, and is threadedly connected with an inner wall of the tooth pipe; the upper end of the tooth cover is arranged with a lower cover, the lower cover connect to an upper cover, and a top of the upper cover is arranged with a plate, and a lower joint is arranged in the axis opening of the upper cover, and the lower joint is pressed on the plate; the lower joint, the upper cover and the lower cover are all sleeved on the spool rod in the spool; the spool rod is connected with an upper joint, the top of the spool rod is connected to a bracket by means of the upper joint, the bracket is embedded with a rubber pad, and the upper joint is screwed with a spray head 1 by bearing, and the bearing is fixed on the bracket by the bearing holder, and a top end of the upper joint is sleeved with a water blocking cap; wherein, the glass washer further comprises:

a connecting rod, one end of the connecting rod is sleeved on the spool sleeve in the spool, and the other end passes through the gap between the upper cover and the lower cover, then connect with the handle by a fastening screw;

a cold water pipe, the cold water pipe is connected to the first port of the spool;

a hot water pipe, the hot water pipe is connected to the second port of the spool.

Further, the spool also comprises a shell, a ferrule, a spring, a screw and a chassis; the chassis is sheathed with a shell, the ferrule is embedded in the shell above the chassis, a lower end of the spool sleeve is inserted into the ferrule, and a spool rod is inserted in the spool sleeve, and a bottom end of the spool rod is connected with a screw, a lower end of the spring is set in conflict with the inner bottom wall of the spool sleeve, and the upper end of the spring is set in conflict with the top of the inner concave section; multiple water holes are set on the chassis; wherein also comprises:

a lower ceramic sheet, the lower ceramic sheet is clamped in the chassis, and has openings corresponding to the number of water holes on the chassis;

an upper ceramic sheet, the upper ceramic sheet is arranged on the lower ceramic sheet, and its upper end is clamped in the bottom of the ferrule, and an opening is opened in the center of the upper ceramic sheet.

Further, several O-rings I are arranged between the spool sleeve and the spool rod, and the O-ring I is embedded in an annular groove of the outer ring wall of the spool rod;

an O-ring II is embedded in the top annular groove of the spool rod, and the O-ring II is located between the top of the spool rod and the upper joint;

an O-ring III is interposed between the screw and the bottom end of the spool rod.

Further, an O-ring IV is sandwiched at the top contact position between the ferrule and the upper ceramic sheet;

sealing rings are embedded in the upper and lower tanks of the chassis.

Further, the third port of the spool is connected to an external water outlet device by a connecting pipeline.

Further, an O-loop I is arranged at the joint between the water blocking cap and the upper joint;

an O-loop II is arranged at the contact position between the bearing holder and the injection head;

an O-loop III is arranged between the contact surface of the lower joint and the plate.

Further, an O-loop V is embedded in the lower end surface of the lower cover.

Further, between the connecting rod and the contact surfaces of the upper cover and the lower cover, there are respectively arranged wear-resistant ring II and wear-resistant ring I.

Further, the upper surface of the lower cover is embedded with a wear-resistant ring III.

Further, a stainless steel gasket is arranged on the top of the tooth cover, and a rubber gasket is sandwiched between the stainless steel gasket and the lower cover.

Compared with the prior art, the beneficial effect of the present disclosure is that the present disclosure provides a glass washer with adjustable water temperature, which uses the cold water pipe and the hot water pipe to connect the cold and hot water respectively, and uses the connecting rod to control the rotation of the valve core. Then select different water outlets, thereby realizing the regulation of the water temperature, effectively solving the discomfort of using cold water to clean the cup in a cold environment.

Figure 1:
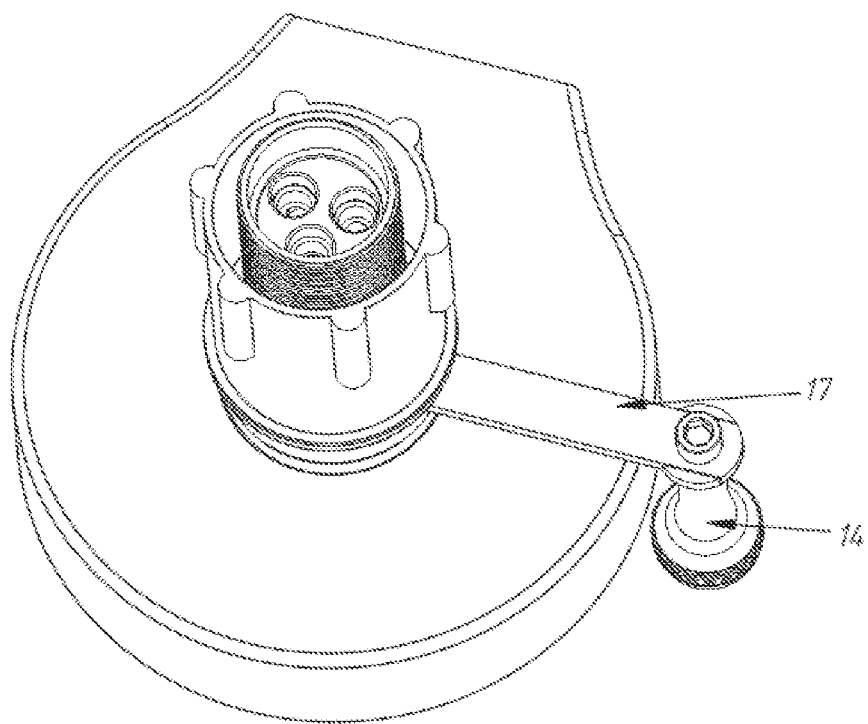
FIG. 1 is a partial structural schematic diagram of a cup washer according to an embodiment of the present disclosure.
Figure 2:
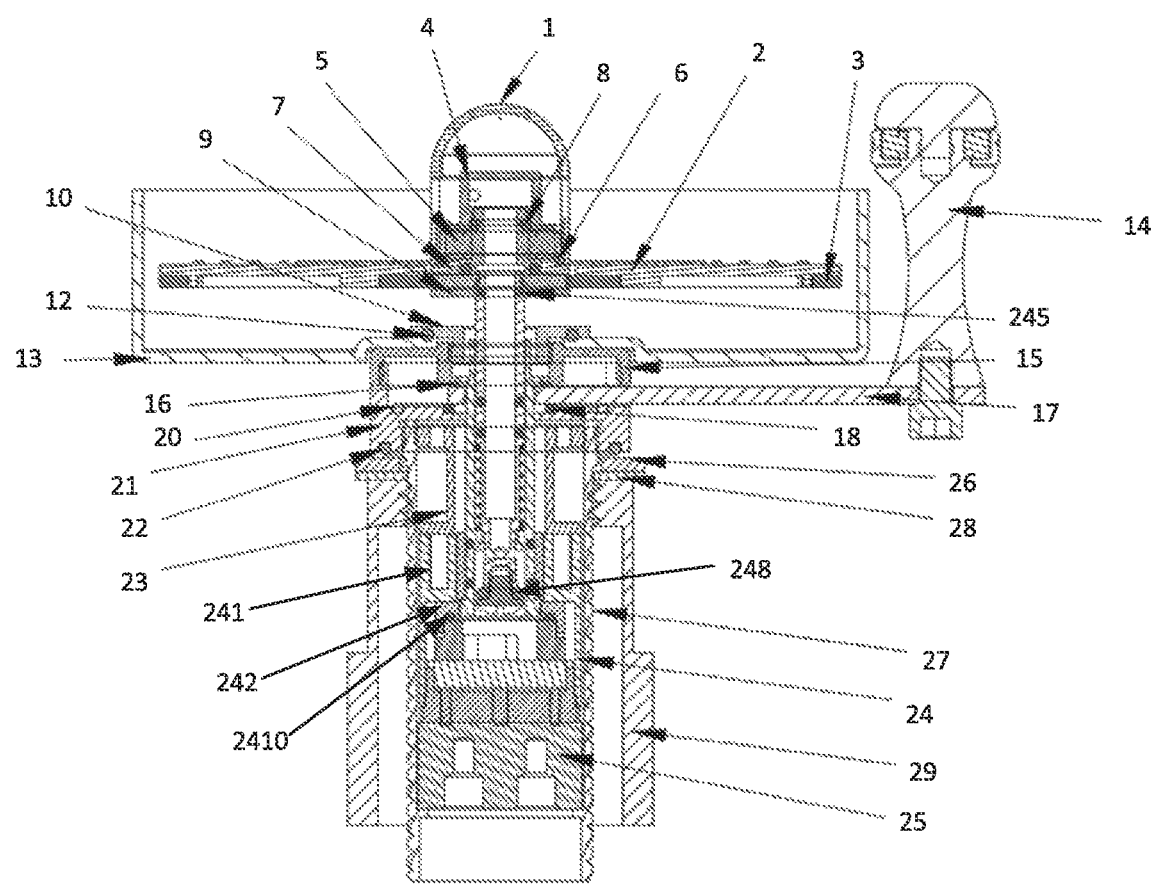
FIG. 2 is a cross-sectional schematic diagram of the cup washer in FIG. 1.
Figure 3:
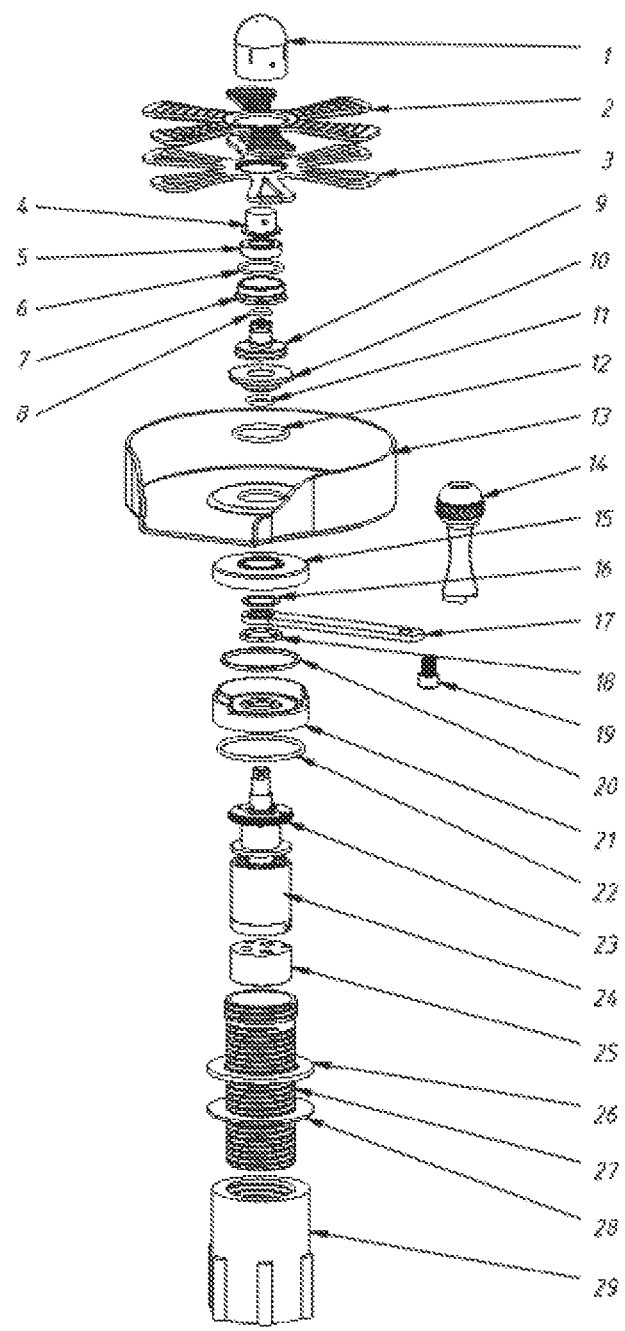
FIG. 3 is an exploded schematic diagram of the cup washer in FIG. 1.

Explanation of reference signs:

Injection head 1, rubber pad 2, bracket 3, water blocking cap 4, bearing 5, O-loop II 6, bearing holder 7, O-loop 18, upper joint 9, lower joint 10, O-loop IV 11, O-loop III 12, plate 13, handle 14, upper cover 15, wear-resistant ring II 16, connecting rod 17, wear-resistant ring I 18, fastening screw 19, wear-resistant ring III 20, lower cover 21, O-loop V 22, gland nut 23, spool 24, spool seat 25, rubber gasket 26, tooth pipe 27, stainless steel gasket 28, tooth cover 29, cold water pipe 30, hot water pipe 31, connecting pipe 32, external water outlet device 33, shell 241, ferrule 242, spool sleeve 243, O-ring I 244, O-ring II 245, spool rod 246, spring 247, O-ring III 248, screw 249, O-ring IV 2410, an upper ceramic sheet 2411, a lower ceramic sheet 2412, a sealing ring 2413, a chassis 2414, a first port 2415, and a second port 2416.

DETAILED DESCRIPTION

The technical solution in the present disclosure will be clearly and completely described below in conjunction with the accompanying drawings, and the preferred embodiment in the description is only used as an example, and all other embodiments obtained by those skilled in the art without making creative work, all belong to the scope of protection of the present disclosure.

As shown in FIGS. 1-5, this specific embodiment adopts the following technical solutions: it comprises a spool 24, a spool seat 25, a tooth pipe 27 and a tooth cover 29, the spool 24 comprises a spool sleeve 243, a spool rod 246, a first port 2415 and a second port 2416, an outer sleeve of the spool seat 25 is arranged with a tooth pipe 27, and a external thread of the tooth pipe 27 is connected to the tooth cover 29, on the spool seat 25 connect the spool 24; a gland nut 23 is arranged on the spool 24, and is threadedly connected with an inner wall of the tooth pipe 27; a stainless steel gasket 28 is arranged on the top of the tooth cover 29, the upper end of the tooth cover 29 is arranged with a lower cover 21, a rubber gasket 26 is sandwiched between the stainless steel gasket 28 and the lower cover 21, an O-loop V 22 is embedded in the lower end surface of the lower cover 21, the upper surface of the lower cover 21 is embedded with a wear-resistant ring III 20, the lower cover 21 connect to an upper cover 15, and a top of the upper cover 15 is arranged with a plate 13, and a lower joint 10 is arranged in the axis opening of the upper cover 15, and the lower joint 10 is pressed on the plate 13; an O-loop III 12 is arranged between the contact surface of the lower joint 10 and the plate 13, the lower joint 10, the upper cover 15 and the lower cover 21 are all sleeved on the spool rod 246 in the spool 24; the spool rod 246 is connected with an upper joint 9, the top of the spool rod 246 is connected to a bracket 3 by means of the upper joint 9, the bracket 3 is embedded with a rubber pad 2, the connection between the top of the spool rod 246 and the upper joint 9 is arranged with an O-pool IV 11; and the upper joint 9 is screwed with a spray head 1 by bearing 5, an O-loop II 6 is arranged at the contact position between the bearing holder 7 and the injection head 1; and the bearing 5 is fixed on the bracket 3 by the bearing holder 7, and a top end of the upper joint 9 is sleeved with a water blocking cap 4, an O-loop I 8 is arranged at the joint between the water blocking cap 4 and the upper joint 9. The glass washer further comprises:

A connecting rod 17, one end of the connecting rod 17 is sleeved on the spool sleeve 243 in the spool 24, and the other end passes through the gap between the upper cover 15 and the lower cover 21, then connect with the handle 14 by a fastening screw 19; between the connecting rod 17 and the contact surfaces of the upper cover 15 and the lower cover 21, there are respectively arranged wear-resistant ring II 16 and wear-resistant ring I 18.

A cold water pipe 30, the cold water pipe 30 is connected to the first port 2415 of the spool 24.

A hot water pipe 31, the hot water pipe 31 is connected to the second port 2416 of the spool 24. The third port 2417 of the spool 24 is connected to an external water outlet device 33 by a connecting pipeline 32.

When using the present disclosure, the cold water pipe 30 and the hot water pipe 31 are used as a whole to connect the existing cold and hot water angle valves under the cabinet respectively. When the cup needs to be cleaned, the cup is buckled upside down on the plate 13, so that the bracket 3 is located inside the cup and is in contact with the inner wall of the cup. The handle 14 drives the connecting rod 17 to rotate, thereby driving the spool rod 246 on the spool 24 to rotate, thereby adjusting the water outlet of the spool 24 and realizing selective use of hot and cold water.

Compared with the prior art, the beneficial effect of the present disclosure is that the present disclosure provides a glass washer with adjustable water temperature, which uses the cold water pipe and the hot water pipe to connect the cold and hot water respectively, and uses the connecting rod to control the rotation of the valve core. Then select different water outlets, thereby realizing the regulation of the water temperature, effectively solving the discomfort of using cold water to clean the cup in a cold environment.

Figure 6:
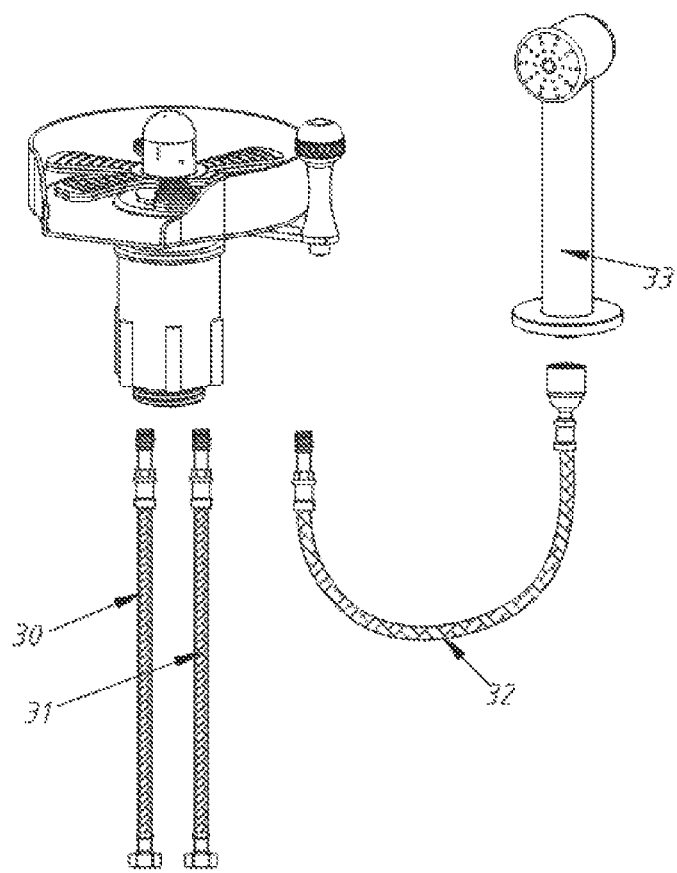
FIG. 6 is an exploded view of the overall structure of a cup washer according to an embodiment of the present disclosure.

Referring to FIG. 6, in this embodiment, the third port 2417 on the spool 24 in this device is used to connect the connecting pipeline 32 and the external water outlet device 33 (water outlet device such as spray guns and faucets). Wherein, the external water outlet device 33 is detachable, and when it needs to be detached, the connecting pipeline 32 and the third port 2417 can be detached. In addition, when the external water outlet device 33 is a spray gun, a bracket can be fixed such as glued on one side of the cup washer, and the bracket can be used to place the spray gun, which can be directly removed from the bracket when the spray gun needs to be used.

Figure 4:
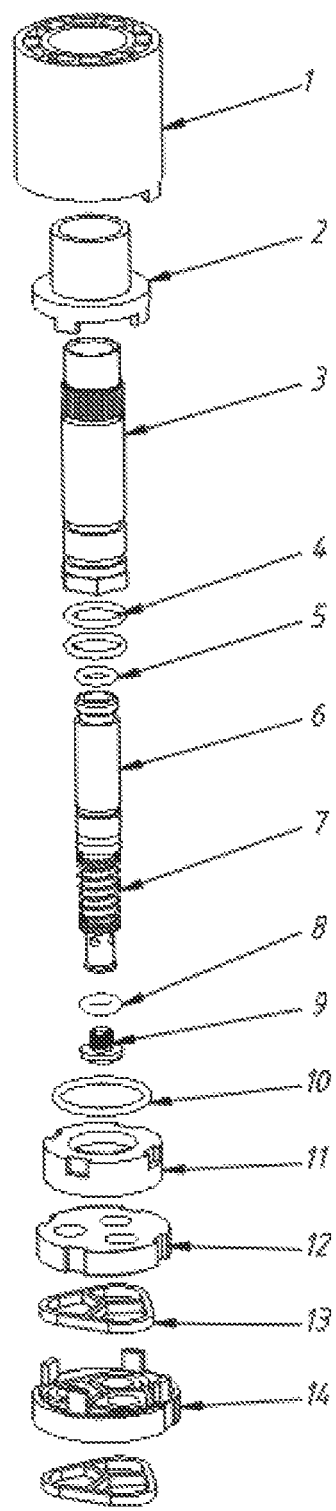
FIG. 4 is an exploded schematic diagram of the valve core according to an embodiment of the present disclosure.
Figure 5:
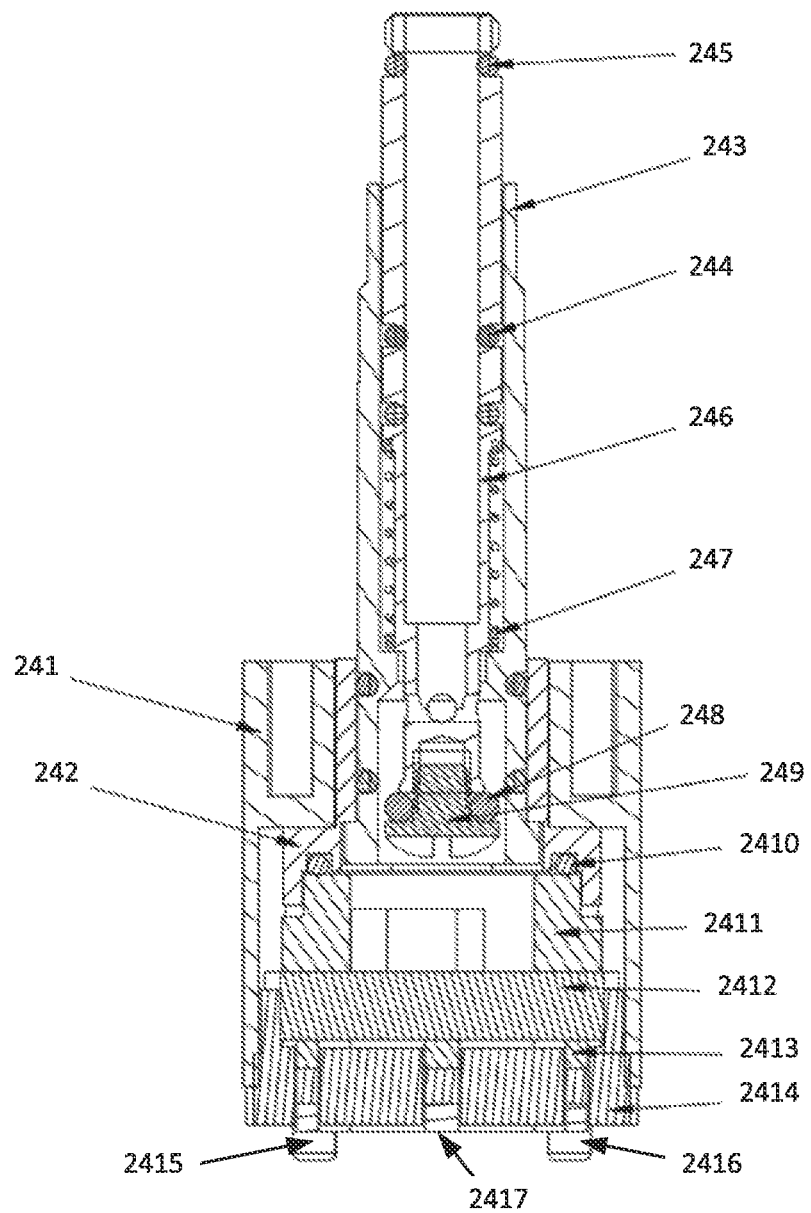
FIG. 5 is a cross-sectional schematic diagram of the valve core according to an embodiment of the present disclosure.

Further, as shown in FIG. 4 and. FIG. 5, the spool 24 also comprises a shell 241, a ferrule 242, a spring 247, a screw 249 and a chassis 2414; the upper and lower tanks of the chassis 2414 are embedded with sealing rings 2413 (the sealing rings 2413 have a triangular structure, and three openings are opened up and down); the upper surface of the chassis 2414 is integrally formed with four butt columns on the peripheral wall; the chassis 2414 is sheathed with a shell 241, the ferrule 242 is embedded in the shell 241 above the chassis 2414, the periphery of the bottom surface of the ferrule 242 is integrally formed with four clamping columns, a lower end of the spool sleeve 243 is inserted into the ferrule 242, and a spool rod 246 is inserted in the spool sleeve 243, the top annular groove of spool rod 246 is embedded with O-ring II 245 (apron); between spool sleeve 243 and spool rod 246, two O-ring I 244 (apron) are arranged, and two O-rings II 244 are respectively embedded in two annular grooves on the outer ring wall of the spool rod 246; and a bottom end of the spool rod 246 is connected with a screw 249, an O-ring III 248 (apron) is sandwiched between the screw 249 and the bottom end of the spool rod 246; a lower end of the spring 247 is set in conflict with the inner bottom wall of the spool sleeve 243, and the upper end of the spring 247 is set in conflict with the top of the inner concave section; multiple water holes (two water inlet holes and one water outlet hole) are set on the chassis 2414; wherein also comprises;

A lower ceramic sheet 2412, the outer wall of the lower ceramic sheet 2412 is concaved with four docking grooves, which are set by using the docking grooves to cooperate with the docking columns on the top of the chassis 2414, and three openings are arranged in the lower ceramic sheet 2412, which are respectively connected to the water hole on the chassis 2414.

An upper ceramic sheet 2411, the peripheral wall of the upper ceramic sheet 2411 is recessed with four slots, the upper ceramic sheet 2411 is arranged on the lower ceramic sheet 2412, and it uses the slots on the peripheral wall to cooperate with the post at the bottom of the ferrule 242. It is assumed that an O-ring IV 2410 (rubber ring) is sandwiched between the ferrule 242 and the top contact position of the upper ceramic sheet 2411; an opening is opened in the center of the upper ceramic sheet 2411.

Wherein, cold water and hot water enter between the lower ceramic sheet 2412 and the upper ceramic sheet 2411 respectively from the first port 2415 and the second port 2416 at the bottom of the chassis 2414, and mix, and then a part of the mixed water flows enters the bottom of the spool rod 246 from the opening of the center of the upper ceramic sheet 2411, and enters the spool rod 246 from the water inlet hole at the lower end of the spool rod 246, and finally is discharged by the spool rod 246; another part of the mixed water enters the third port 2417 of the chassis 2414 through the third opening in the lower ceramic sheet 2412, and the water is discharged from the third port 2417 (the required water outlet equipment, such as spray guns, faucets, etc., the pipeline connects the third port of the chassis 2414 and the third opening of the lower ceramic sheet 2412).

Through the spool 24 of this embodiment, the function of water outlet up and down can be realized, so that it can be more widely used in diversified water outlet demands.

For those skilled in the art, they can modify the technical solutions described in the foregoing embodiments, and perform equivalent replacements of some technical features. Any modifications and equivalent replacements made within the spirit and principles of the present disclosure, improvements, etc., all should be included within the protection scope of the present disclosure.

What is claimed is:

1. A glass washer with adjustable water temperature, comprising a spool, a spool seat, a tooth pipe and a tooth cover, the spool comprises a spool sleeve, a spool rod, a first port and a second port, an outer sleeve of the spool seat is arranged with a tooth pipe, and a external thread of the tooth pipe is connected to the tooth cover, on the spool seat connect the spool; a gland nut is arranged on the spool, and is threadedly connected with an inner wall of the tooth pipe; the upper end of the tooth cover is arranged with a lower cover, the lower cover connect to an upper cover, and a top of the upper cover is arranged with a plate, and a lower joint is arranged in the axis opening of the upper cover, and the lower joint is pressed on the plate; the lower joint, the upper cover and the lower cover are all sleeved on the spool rod in the spool; the spool rod is connected with an upper joint, the top of the spool rod is connected to a bracket by means of the upper joint, the bracket is embedded with a rubber pad, and the upper joint is screwed with a spray head by bearing, and the bearing is fixed on the bracket by the bearing holder, and a top end of the upper joint is sleeved with a water blocking cap; wherein, the glass washer further comprises:

a connecting rod, one end of the connecting rod is sleeved on the spool sleeve in the spool, and the other end passes through the gap between the upper cover and the lower cover, then connect with a handle by a fastening screw;

a cold water pipe, the cold water pipe is connected to the first port of the spool;

a hot water pipe, the hot water pipe is connected to the second port of the spool, wherein rotation of the connecting rod rotates and adjusts the spool rod on the spool realizing selective use of the cold and hot water to regulate the water temperature.

2. The glass washer with adjustable water temperature according to claim 1, wherein the spool also comprises a shell, a ferrule, a spring, a screw and a chassis; the chassis is sheathed with a shell, the ferrule is embedded in the shell above the chassis, a lower end of the spool sleeve is inserted into the ferrule, and a spool rod is inserted in the spool sleeve, and a bottom end of the spool rod is connected with a screw, a lower end of the spring is set in conflict with the inner bottom wall of the spool sleeve, and the upper end of the spring is set in conflict with the top of the inner concave section; multiple water holes are set on the chassis; wherein also comprises:

a lower ceramic sheet, the lower ceramic sheet is clamped in the chassis, and has openings corresponding to the number of water holes on the chassis;

an upper ceramic sheet, the upper ceramic sheet is arranged on the lower ceramic sheet, and its upper end is clamped in the bottom of the ferrule, and an opening is opened in the center of the upper ceramic sheet.

3. The glass washer with adjustable water temperature according to claim 2, wherein several O-rings I are arranged between the spool sleeve and the spool rod, and the O-ring I is embedded in an annular groove of the outer ring wall of the spool rod;

an O-ring II is embedded in the top annular groove of the spool rod, and the O-ring II is located between the top of the spool rod and the upper joint;

an O-ring III is interposed between the screw and the bottom end of the spool rod.

4. The glass washer with adjustable water temperature according to claim 2, wherein an O-ring IV is sandwiched at the top contact position between the ferrule and the upper ceramic sheet;

sealing rings are embedded in the upper and lower tanks of the chassis.

5. The glass washer with adjustable water temperature according to claim 1, wherein the third port of the spool is connected to an external water outlet device by a connecting pipeline.

6. The glass washer with adjustable water temperature according to claim 1, wherein an O-loop I is arranged at the joint between the water blocking cap and the upper joint;

an O-loop II is arranged at the contact position between the bearing holder and the injection head;

an O-loop III is arranged between the contact surface of the lower joint and the plate.

7. The glass washer with adjustable water temperature according to claim 1, wherein an O-loop V is embedded in the lower end surface of the lower cover.

8. The glass washer with adjustable water temperature according to claim 1, wherein between the connecting rod and the contact surfaces of the upper cover and the lower cover, there are respectively arranged wear-resistant ring II and wear-resistant ring I.

9. The glass washer with adjustable water temperature according to claim 1, wherein the upper surface of the lower cover is embedded with a wear-resistant ring III.

10. The glass washer with adjustable water temperature according to claim 1, wherein a stainless steel gasket is arranged on the top of the tooth cover, and a rubber gasket is sandwiched between the stainless steel gasket and the lower cover.

\* \* \* \* \*